US012553769B2

United States Patent
Okamoto et al.

(10) Patent No.: US 12,553,769 B2
(45) Date of Patent: Feb. 17, 2026

(54) POSITIONING METHOD OF ELECTRIC POLE AND ESTIMATING METHOD OF THE STATE OF OVERHEAD OPTICAL FIBER CABLE

(71) Applicant: NTT, Inc., Tokyo (JP)

(72) Inventors: Tatsuya Okamoto, Musashino (JP); Daisuke Iida, Musashino (JP); Yusuke Koshikiya, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 297 days.

(21) Appl. No.: 18/275,726

(22) PCT Filed: Feb. 17, 2021

(86) PCT No.: PCT/JP2021/005852
§ 371 (c)(1),
(2) Date: Aug. 3, 2023

(87) PCT Pub. No.: WO2022/176047
PCT Pub. Date: Aug. 25, 2022

(65) Prior Publication Data
US 2024/0118126 A1 Apr. 11, 2024

(51) Int. Cl.
*G01H 9/00* (2006.01)
*G01D 5/353* (2006.01)

(52) U.S. Cl.
CPC ......... *G01H 9/004* (2013.01); *G01D 5/35358* (2013.01)

(58) Field of Classification Search
CPC .... G01B 11/14; G01B 11/16; G01D 5/35358; G01D 5/35361; G01D 5/35374;
(Continued)

(56) References Cited

U.S. PATENT DOCUMENTS 10,451,770 B2 * 10/2019 Godard .................. G01W 1/14
2019/0284931 A1 9/2019 Reinsch et al.
(Continued)

FOREIGN PATENT DOCUMENTS

| CN | 107727227 A | 2/2018 | |
| CN | 109297662 A * | 2/2019 | ............. G01M 7/02 |

(Continued)

OTHER PUBLICATIONS

Liang et al, Online Multi-Parameter Monitoring in Overhead Transmission Lines Based on Distributed Optical Fiber Sensor, 2021 the 4th International Conference on Energy, Electrical and Power Engineering, IEEE (Year: 2021).*

(Continued)

*Primary Examiner* — David L Singer
(74) *Attorney, Agent, or Firm* — Harness, Dickey & Pierce, P.L.C.

(57) ABSTRACT

A method is presented for remotely identifying a utility pole position and estimating a state of an overhead optical fiber cable. The method includes identifying a boundary region of a vibration distribution as a utility pole position, from a vibration distribution pattern obtained by measuring strain amounts with respect to distances of an optical fiber by an optical fiber vibration distribution measuring method at each time and sequentially stacking the strain amounts.

1 Claim, 8 Drawing Sheets

(58) Field of Classification Search
CPC .......... G01H 9/004; G02B 6/48; G02B 6/483; H02G 1/02

See application file for complete search history.

(56) References Cited

U.S. PATENT DOCUMENTS

| | | | |
|---|---|---|---|
| 2020/0319017 A1* | 10/2020 | Tian | G02B 6/483 |
| 2020/0370950 A1* | 11/2020 | Ip | G01B 9/02015 |
| 2021/0172729 A1* | 6/2021 | Huang | G01L 1/242 |
| 2021/0172767 A1 | 6/2021 | Yoda et al. | |
| 2021/0247214 A1* | 8/2021 | Yoda | G01D 5/35338 |
| 2021/0247215 A1* | 8/2021 | Yoda | G02B 6/48 |
| 2021/0318166 A1* | 10/2021 | Ding | G01H 9/004 |
| 2023/0024381 A1* | 1/2023 | Sakae | G01H 9/004 |
| 2023/0341290 A1* | 10/2023 | Iwano | G01M 7/025 |
| 2023/0417593 A1* | 12/2023 | Iwano | G01H 9/004 |
| 2024/0003738 A1* | 1/2024 | Iwano | G01V 9/00 |
| 2024/0118115 A1* | 4/2024 | Iwano | G01H 9/004 |

FOREIGN PATENT DOCUMENTS

| | | | | |
|---|---|---|---|---|
| CN | 111238627 A | * | 6/2020 | ............ G01H 9/004 |
| CN | 111442788 A | * | 7/2020 | ............ G06N 3/08 |
| WO | WO-2020/044648 A1 | | 3/2020 | |
| WO | 2020/237032 A1 | | 11/2020 | |

OTHER PUBLICATIONS

Okamoto et al, Identification of Sagging Aerial Cable Section by Distributed Vibration Sensing based on OFDR, 2019 Optical Fiber Communications Conference and Exhibition (OFC), IEEE (Year: 2019).*

Daisuke Iida et al., "Measurement of fiber length at the manhole with optical fiber vibration sensing", 2019 IEICE General Conference, B-13-10, 2019.

Tiejun J. Xia et al., "First Proof That Geographic Location on Deployed Fiber Cable Can Be Determined by Using OTDR Distance Based on Distributed Fiber Optical Sensing Technology", in Proc OFC2020, Th3A.5, 2020.

Kenneth O. Hill et al., "Fiber Bragg Granting Technology Fundamentals and Overview", Journal of Lightwave Technology, vol. 15, No. 8, Aug. 1997.

* cited by examiner

POSITIONING METHOD OF ELECTRIC POLE AND ESTIMATING METHOD OF THE STATE OF OVERHEAD OPTICAL FIBER CABLE

CROSS-REFERENCE TO RELATED APPLICATIONS

This application is a 371 U.S. National Phase of International Application No. PCT/JP2021/005852, filed on Feb. 17, 2021. The entire disclosure of the above application is incorporated herein by reference.

TECHNICAL FIELD

The present invention relates to a utility pole position identifying method and a method for estimating a state of an overhead optical fiber cable using an optical fiber vibration distribution measuring method.

BACKGROUND ART

Conventionally, in order to minimize a failure risk of an overhead optical fiber cable, a state of the overhead optical fiber cable has been visually ascertained. That is, workers have been dispatched to the site, where they ascertain whether a heavy object is hanging on the optical fiber cable or whether a tree or the like was in contact with the optical fiber cable. Relying on such visual observation cannot avoid human operation.

In order to search for a failure of an optical fiber cable, there is an optical pulse test method. In the optical pulse test method, even though a distance at which a loss has occurred is determinable, the failure position cannot be identified unless comparability of the distance with that of the facility position.

In order to compare with the facility position, a method of intentionally applying vibration to an optical fiber cable has been proposed (see, for example, Non Patent Literature 1 and Non Patent Literature 2). In the methods described in Non Patent Literature 1 and Non Patent Literature 2, vibration is applied to an optical fiber cable or the like, and a temporal change of scattered light at a specific position is measured by an optical pulse test method.

CITATION LIST

Non Patent Literature

Non Patent Literature 1: Daisuke Iida et al., 2019 IEICE General Conference, B-13-10.
Non Patent Literature 2: Tiejun J. Xia et al., in Proc OFC2020, Th3A.5.

SUMMARY OF INVENTION

Technical Problem

However, also in the methods described in Non Patent Literatures 1 and 2, it is necessary to dispatch workers to the site where they apply vibration. Therefore, human operation cannot be avoided.

For this reason, it has been a problem to identify a utility pole position and estimate the state of overhead optical fiber cables without dispatching workers to the site.

Therefore, an object of the present disclosure is to provide a method for remotely identifying a utility pole position and estimating a state of an overhead optical fiber cable.

Solution to Problem

In a utility pole position identifying method and a method for estimating a state of an overhead optical fiber cable according to the present disclosure, a utility pole position is identified from a vibration distribution pattern with respect to an optical fiber distance and a state of an overhead optical fiber cable is estimated using an optical fiber vibration distribution measuring method (distributed acoustic sensing (DAS)).

Specifically, a method for identifying a utility pole position according to the present disclosure includes identifying a boundary region of a vibration distribution as a utility pole position, from a vibration distribution pattern obtained by measuring strain amounts with respect to distances of an optical fiber by an optical fiber vibration distribution measuring method at each time and sequentially stacking the strain amounts.

Specifically, a method for estimating a state of an overhead optical fiber cable according to the present disclosure includes determining that the optical fiber cable is normal on condition of vibration propagating along an optical fiber and a uniform amplitude of vibration, from a vibration distribution pattern obtained by measuring strain amounts with respect to optical fiber distances in a utility pole span by an optical fiber vibration distribution measuring method at each time and sequentially stacking the strain amounts.

Specifically, a method for estimating a state of an overhead optical fiber cable according to the present disclosure includes determining that the optical fiber cable has a load due to adhering matter on condition of vibration propagating along an optical fiber and an ununiform amplitude of vibration, from a vibration distribution pattern obtained by measuring strain amounts with respect to optical fiber distances in a utility pole span by an optical fiber vibration distribution measuring method at each time and sequentially stacking the strain amounts.

Specifically, a method for estimating a state of an overhead optical fiber cable according to the present disclosure includes determining that a ground obstacle is in contact with an optical fiber cable on condition of vibration stopped or reduced in the middle of an optical fiber, from a vibration distribution pattern obtained by measuring strain amounts with respect to optical fiber distances in a utility pole span by an optical fiber vibration distribution measuring method at each time and sequentially stacking the strain amounts.

Advantageous Effects of Invention

The present disclosure allows to provide a method for remotely identifying a utility pole position and estimating a state of an overhead optical fiber cable.

DESCRIPTION OF EMBODIMENTS

Hereinafter, embodiments of the present disclosure will be described in detail with reference to the drawings. The present disclosure is not limited to the embodiments described below. These embodiments are merely examples, and the present disclosure can be carried out in forms with various modifications and improvements based on the knowledge of those skilled in the art. Note that components having the same reference signs in the present description and the drawings indicate the same components.

First Embodiment

Figure 1:
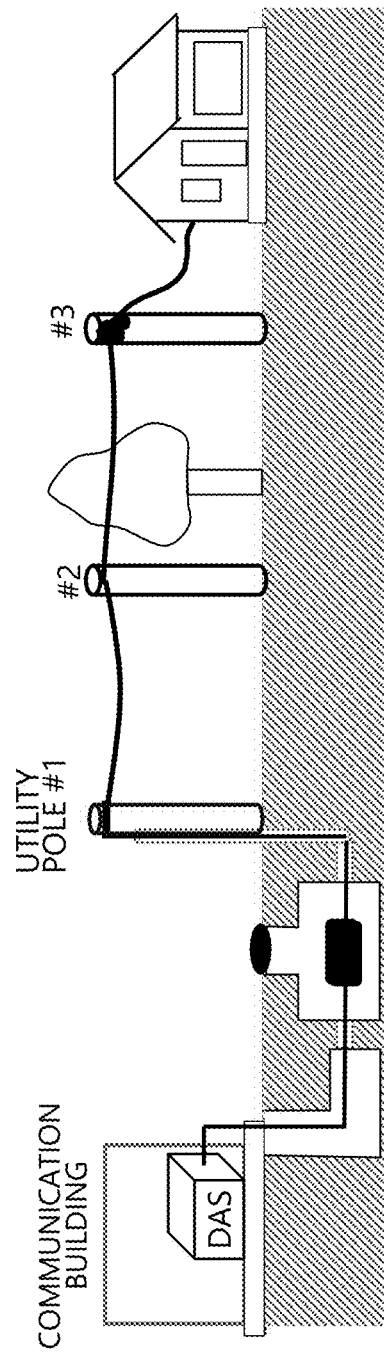
FIG. 1 is a schematic diagram illustrating a state of suspension of an overhead optical fiber cable.

A utility pole position identifying method using an optical fiber vibration distribution measuring method (distributed acoustic sensor (DAS)) will be described. FIG. 1 is a schematic diagram for identifying a utility pole position from a vibration distribution pattern with respect to an optical fiber distance and illustrating a state of suspension of an overhead fiber cable using a DAS. An optical signal is input to an optical cable from an optical fiber vibration distribution measuring device installed in a communication building. The optical signal propagates from an optical fiber cable laid underground to an optical fiber cable laid overhead. Rayleigh scattering is induced in the optical fiber during propagation, and part of the Rayleigh scattered light, scattered to the optical fiber vibration distribution measuring device side, returns as backscattered light.

A known optical time domain reflectometer (OTDR) or optical frequency domain reflectometer (OFDR) can be applied as a means for measuring backscattered light. It is known that the vibration frequency of the overhead optical fiber cable is 10 Hz or less and the wavelength is about 2 m. The measurement performance that the means for measuring backscattered light requires is a sampling frequency of 20 Hz or more and a spatial resolution of about 1 m. At present, a coherent OTDR (C-OTDR) or an OFDR satisfies this requirement.

Figure 2:
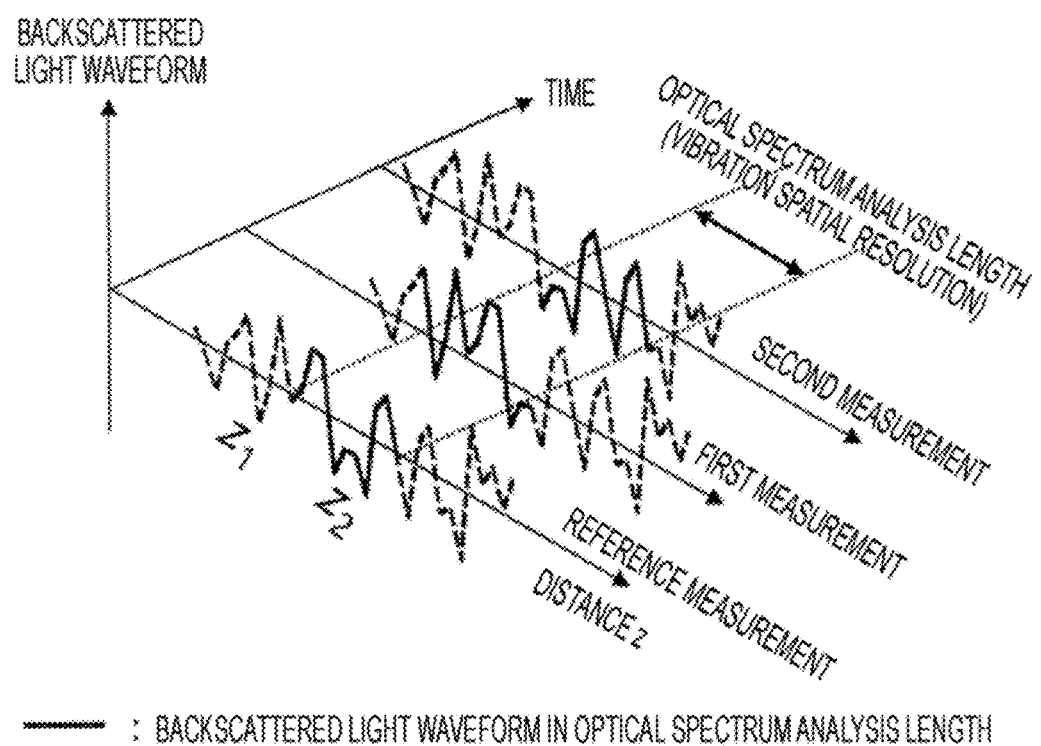
FIG. 2 is a diagram illustrating a measurement principle of a DAS.

The measurement principle of a DAS will be described with reference to FIGS. 2 and 3. The DAS in the present embodiment uses an optical frequency domain reflectometer (OFDR) as a backscattered light measurement means to measure a backscattered light waveform with respect to a distance Z of the optical fiber cable. As illustrated in FIG. 2, first, the backscattered light intensity with respect to the distance of the optical fiber cable, which is "reference measurement", is acquired, and then, the backscattered light waveforms, which are "first measurement", "second measurement", . . . , and "n-th measurement", are sequentially acquired.

Figure 3:
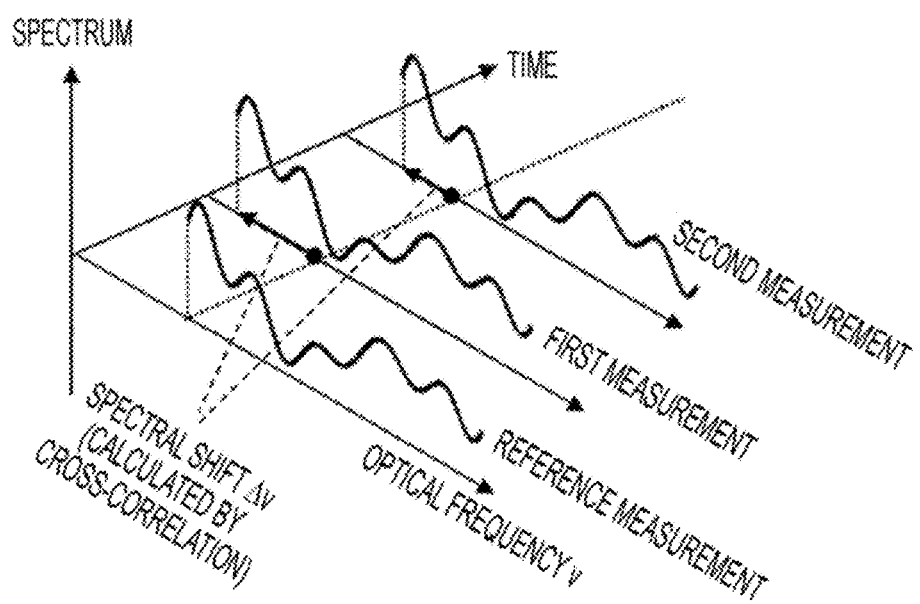
FIG. 3 is a diagram illustrating a measurement principle of a DAS.

For example, when a waveform at a distance between Z1 and Z2 (solid line portion in FIG. 2) of these waveforms is subjected to spectrum analysis (Fourier transform) to calculate a spectral shift, a spectrum waveform in FIG. 3 is obtained. A spectrum obtained at the time of reference measurement is used as a reference waveform, cross-correlation with the spectrum at each time is calculated, and a spectral shift giving a cross-correlation peak is calculated. In this way, as illustrated in FIG. 3, the spectral shift is calculated in the following order: "reference measurement", "first measurement", and "second measurement". A spectral shift Av is expressed by the following equation by modifying Equation (8) of Non Patent Literature 3.

$$\Delta v = -0.78 * \varepsilon * v_0 \tag{1}$$

Here, $\varepsilon$ represents a strain amount, and $v_0$ represents a center frequency of probe light.

Figure 4:
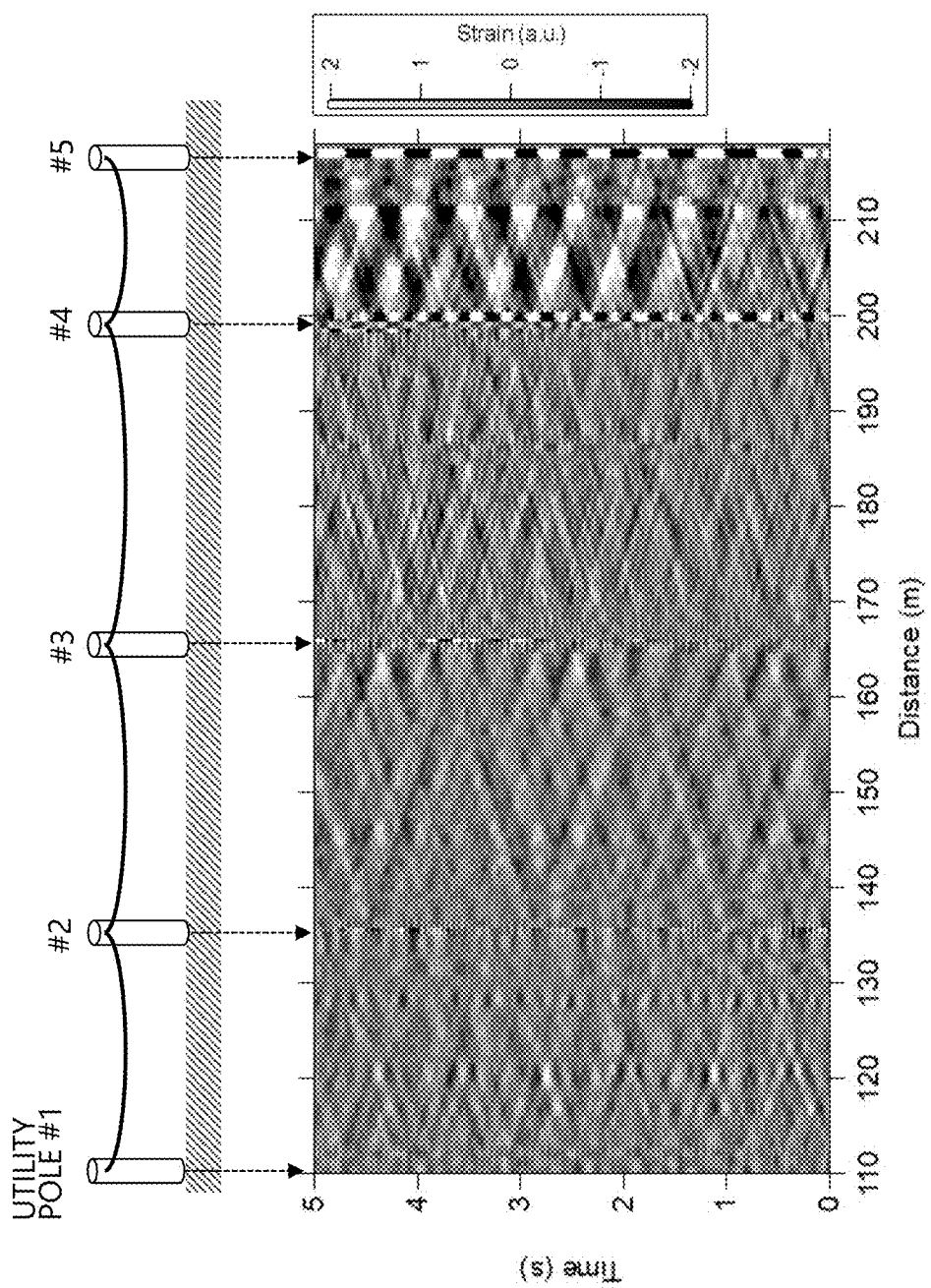
FIG. 4 is a diagram illustrating a vibration distribution pattern of an optical fiber.

When amounts of spectral shift with respect to the distances are represented by a black and white shade, are measured at each time, and are sequentially stacked, the vibration distribution pattern of the optical fiber as illustrated in FIG. 4 is obtained. A portion with positive strain indicates that the optical fiber is stretched, and a portion with negative strain indicates that the optical fiber is compressed. In FIG. 4, the portion with positive strain is represented by white, and the portion with negative strain is represented by black. However, the black and white shade is an example, and this may be replaced with shades of different colors, such as a red shade representing the portion with positive strain, and a blue shade representing the portion with negative strain.

It is allowable to consider the overhead optical fiber cable as a string that vibrates uniquely within each utility pole span. From FIG. 4, the vibration generated by the wind propagates in the utility pole span with time, and the magnitude of the amplitude and the propagation speed of the vibration are different for each utility pole span. For this reason, it has been found that each utility pole span has a different vibration pattern. Conversely, it can be determined that the boundary region of the vibration pattern in FIG. 4 is the utility pole position.

Second Embodiment

Figure 5:
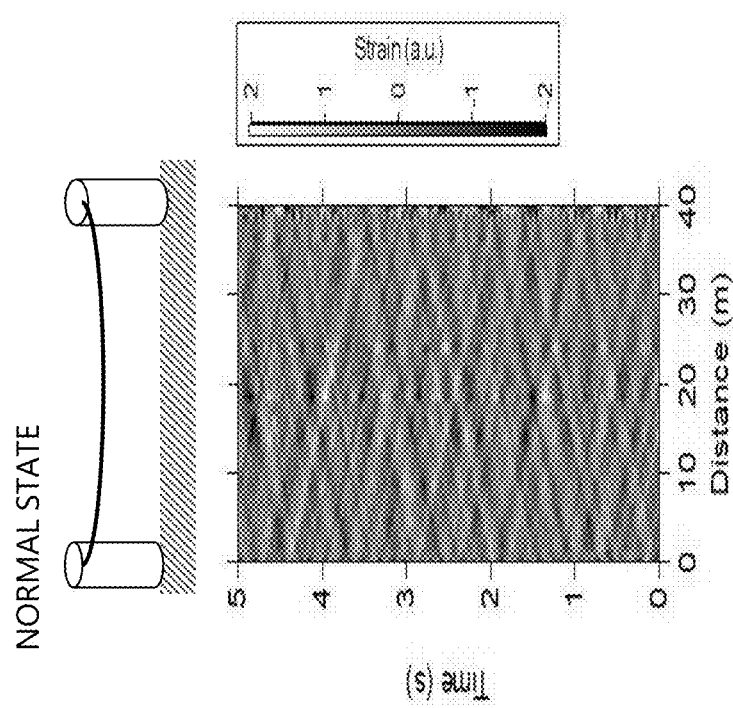
FIG. 5 is a diagram illustrating a vibration distribution pattern of an optical fiber.
Figure 6:
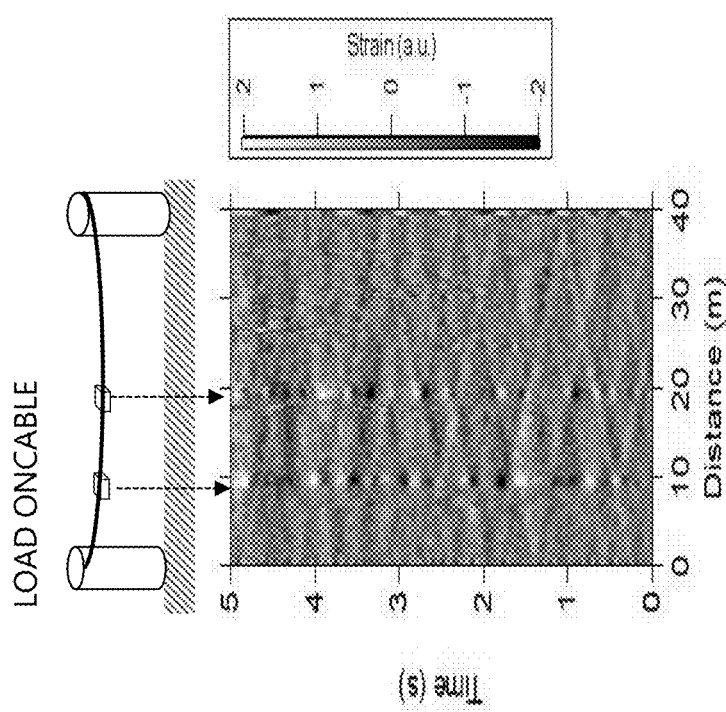
FIG. 6 is a diagram illustrating a vibration distribution pattern of an optical fiber.
Figure 7:
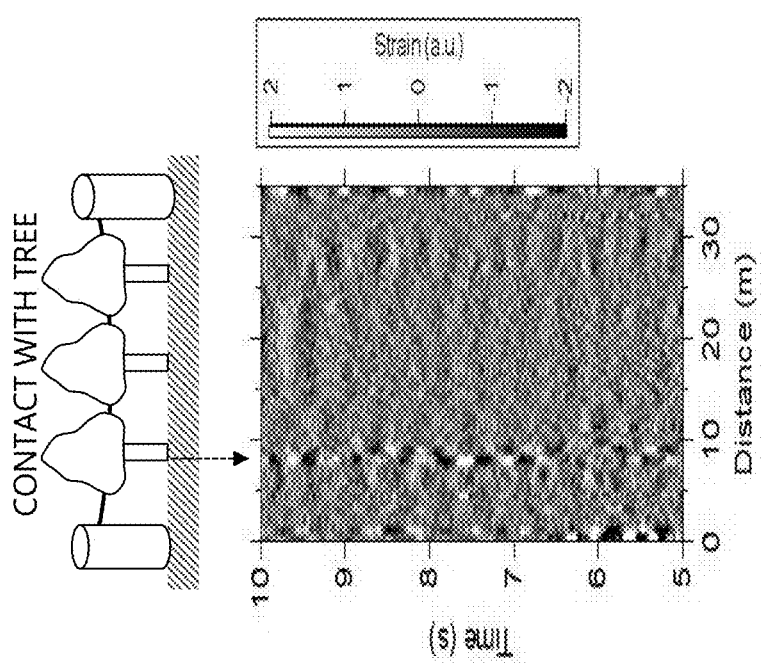
FIG. 7 is a diagram illustrating a vibration distribution pattern of an optical fiber.

A method for estimating a state of an overhead optical fiber cable using the optical fiber vibration distribution measuring method (DAS) will be described. FIGS. 5, 6, and 7 illustrate examples of a vibration distribution pattern of an optical fiber obtained by measuring strain amounts with respect to optical fiber distances in a utility pole span by a DAS at each time and sequentially stacking the strain amounts. It is allowable to consider the overhead optical fiber cable can be regarded as a string that vibrates within each utility pole span, and the laying state of the optical fiber cable can be estimated by measuring the vibration pattern.

FIG. 5 illustrates a vibration pattern in a state where the optical fiber cable is normal. In FIG. 5, it can be seen that the vibration generated by the wind propagates in the utility pole span, with time, along the overhead optical fiber cable, and the amplitude of the vibration is uniform in the utility pole span.

FIG. 6 illustrates a vibration pattern in a state where the optical fiber cable has a load due to adhering matter. In FIG. 6, the vibration generated by the wind propagates along the overhead optical fiber cable in the utility pole span, with time. However, the amplitude of the vibration is large at each load point of the adhering matter. That is, it can be seen that the amplitude of the vibration is ununiform in the utility pole span.

FIG. 7 illustrates a vibration pattern in a state where a ground obstacle, for example, a tree, is in contact with the optical fiber cable. In FIG. 7, it can be seen that the vibration generated by the wind propagates between the utility pole and the ground obstacle, but the vibration is stopped or reduced by the ground obstacle. That is, the vibration is stopped or reduced in the middle of the utility pole span and is not propagated along the optical fiber cable.

Figure 8:
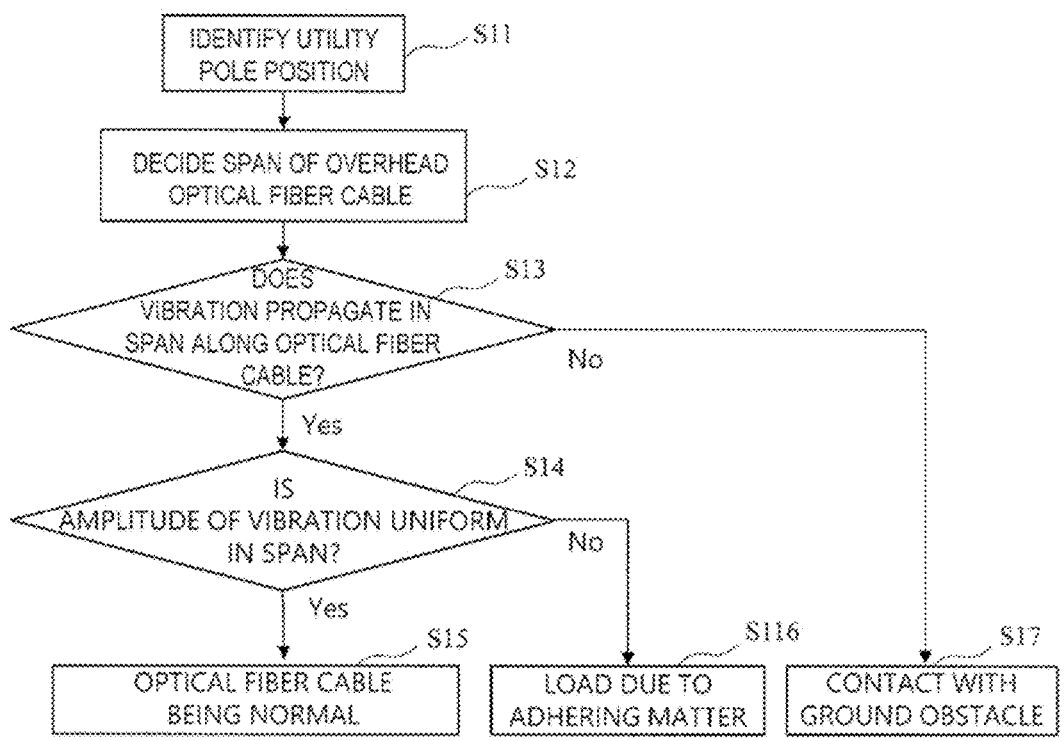
FIG. 8 is a flowchart for determining whether an optical fiber cable is normal or abnormal.

From these phenomena, it is allowed to determine whether the optical fiber cable is normal or abnormal by observing the vibration distribution pattern of the optical fiber. FIG. 8 illustrates a flowchart for determining whether the optical fiber cable is normal or abnormal. In FIG. 8, as described in the first embodiment, the vibration distribution pattern with respect to the optical fiber distance is measured using the optical fiber vibration distribution measuring method (distributed acoustic sensor (DAS)). First, the utility pole position is identified from the boundary region of the vibration pattern (S11). Next, a utility pole span state of the overhead optical fiber cable is decided to be estimated (S12).

When the vibration propagates in the utility pole span along the overhead optical fiber cable (Yes in S13) and the amplitude of the vibration is uniform in the utility pole span (Yes in S14), it is estimated that the optical fiber cable is normal (S15).

When the vibration propagates in the utility pole span along the overhead optical fiber cable (Yes in S13) and the amplitude of the vibration is ununiform in the utility pole span (No in S14), it is estimated that the optical fiber cable has a load due to adhering matter (S16). Furthermore, a discontinuous point of the amplitude of the vibration can be identified as a point where the adhering matter is located.

When the vibration propagates between the utility pole and the ground obstacle but is stopped or reduced in the middle of the utility pole span and does not propagate along the optical fiber cable (No in S13), it is estimated that the optical fiber cable is in contact with the ground obstacle (S17). Furthermore, a vibration stop point or a vibration reduction point can be identified as a point where the optical fiber cable is in contact with the ground obstacle.

As described above, the present disclosure allows to remotely identify a utility pole position, estimate a state of an overhead optical fiber cable, and identify a fault position from a vibration distribution pattern calculated using an optical fiber vibration distribution measuring method (distributed acoustic sensor (DAS)) installed in a communication building.

INDUSTRIAL APPLICABILITY

The present disclosure can be applied to information and communication industries.

The invention claimed is:

1. A method for estimating a state of an overhead optical fiber cable, the method comprising: determining that a ground obstacle is in contact with an optical fiber cable on condition of vibration stopped or reduced in the middle of an optical fiber, from a vibration distribution pattern obtained by measuring strain amounts with respect to optical fiber distances in a utility pole span by an optical fiber vibration distribution measuring method at each time and sequentially stacking the strain amounts.

* * * * *